United States Patent [19]
Culver

[11] 3,745,346
[45] July 10, 1973

[54] CIRCUIT FOR REDUCING PULSE PILE-UP IN PULSE DIRECTION SYSTEMS BY CONVERTING A RANDOM PULSE TRAIN TO THAT OF FIXED FREQUENCY

[75] Inventor: Richard B. Culver, Houston, Tex.

[73] Assignee: Dresser Industries, Inc., Dallas, Tex.

[22] Filed: June 1, 1971

[21] Appl. No.: 148,754

[52] U.S. Cl. .................. 250/83.3 R, 250/83.6 W
[51] Int. Cl. ............................................. G01t 3/00
[58] Field of Search ............... 250/83.3 R, 83.6 W; 307/232, 234, 260; 328/59, 109

[56] References Cited
UNITED STATES PATENTS

| | | | |
|---|---|---|---|
| 3,309,521 | 3/1967 | Bargainer | 250/83.6 W |
| 3,435,224 | 3/1969 | Zemanek | 250/83.6 W |
| 3,559,163 | 1/1971 | Schwartz | 250/83.6 W |

Primary Examiner—James W. Lawrence
Assistant Examiner—D. C. Nelms
Attorney—Robert W. Mayer, Thomas P. Hubbard, Jr., Daniel Rubin, Raymond T. Majesko, Roy L. Van Winkle, William E. Johnson, Jr., Eddie E. Scott and Morgan L. Crow

[57] ABSTRACT

The amplified pulses from a radioactivity detector are coupled to a discriminator and via a 400 nanosecond delay line to the inputs of three charge and hold circuits. The discriminator drives a first modulo 3 scaler-decoder and also a single shot multivibrator. The single shot output and the decoder outputs are AND gated with a sense amplifier sensing the charge and hold capacitor to control the charge and hold circuits. A second modulo 3 scaler-decoder circuit driven by a clock provides the gating of three interrogator circuits connected to the outputs of the three charge and hold circuits, respectively. The circuit converts the random pulse train from the radioactivity detector to that of a train of pulses of a fixed frequency.

6 Claims, 1 Drawing Figure

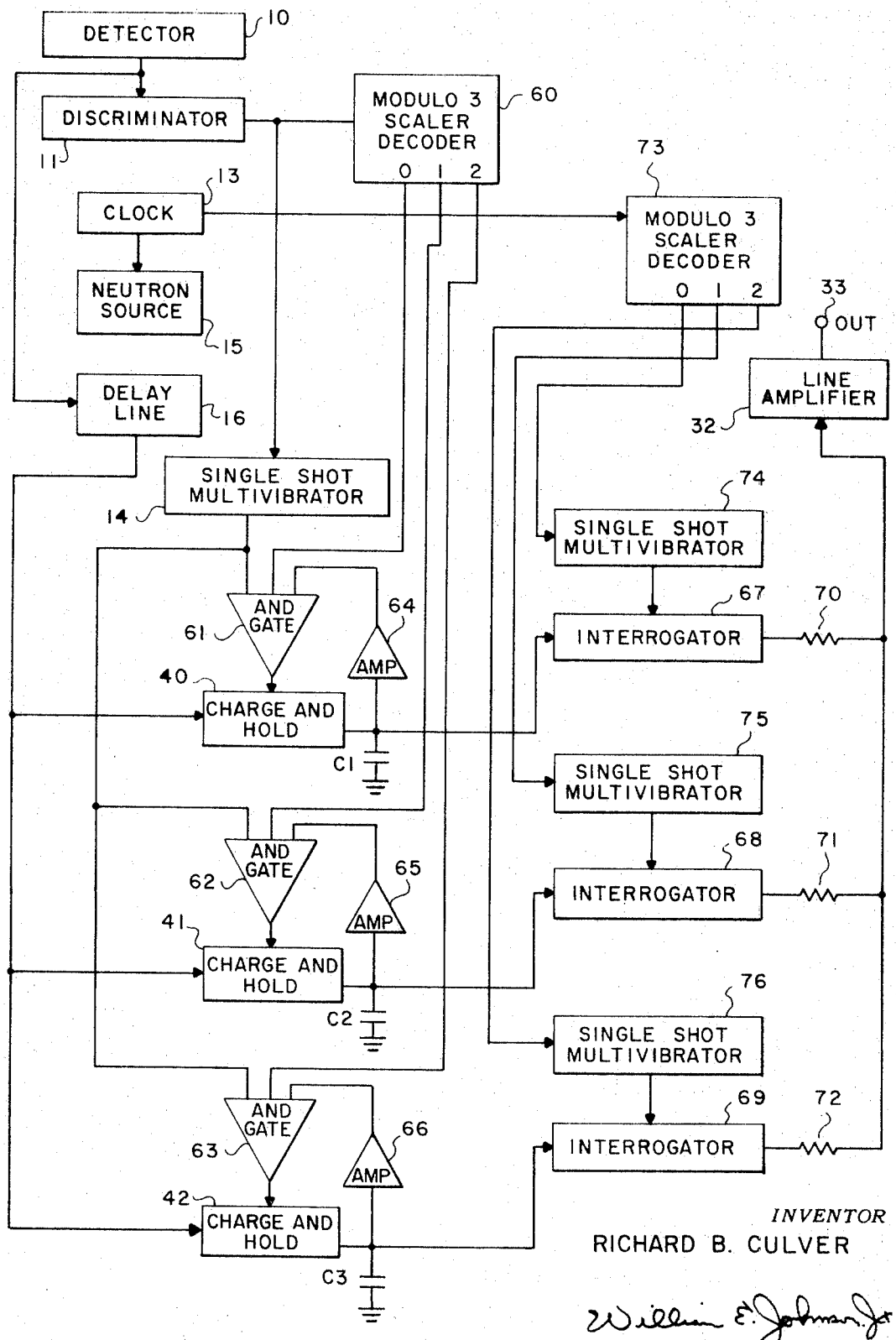

CIRCUIT FOR REDUCING PULSE PILE-UP IN PULSE DIRECTION SYSTEMS BY CONVERTING A RANDOM PULSE TRAIN TO THAT OF FIXED FREQUENCY

RELATED APPLICATIONS

This application relates to my co-pending U.S. Pat. application, Ser. No. 146,261, filed May 24, 1971, entitled CIRCUIT FOR IMPROVING DATA IN PULSE DETECTION SYSTEMS, and to my concurrently filed co-pending U.S. Pat. application Ser. No. 148,765, filed June 1, 1971, entitled CIRCUIT FOR REDUCING PULSE PILE-UP IN PULSE DETECTION SYSTEMS.

BACKGROUND OF THE INVENTION

This invention relates generally to the art of geophysical prospecting and more particularly to the art of radioactivity well logging involving the counting of pulses resulting from the detection of such radioactivity.

For neutron activation analysis and for some thermal neutron capture measurements that are made with a pulsed neutron source, the counting rates are quite high and many pulses are lost due to the dead time of the surface analysis system. Also, pulses may "pile-up" on the line and cause the spectrum to be distorted.

Sodium iodide detectors are normally used in subsurface spectral measurement systems because they offer the best compromise of physical and electrical characteristics. Good linearity and resolution can be obtained with detector output pulse widths of about 1.2 microseconds. However, when the pulses are transmitted over a well logging cable, any pulse arriving at the surface for analysis will have been spread in time to about ten microseconds by its transit over the four miles of cable that typically separates the surface and subsurface systems. The fast multichannel analyzers that are presently available have pulse pair resolving times of about 15 microseconds for pulses of this width.

It is therefore the primary object of the present invention to provide a circuit which substantially reduces the problem of pulse pile-up on the line; and It is still another object of the invention to provide a new and improved circuit for converting a random pulse train from the detector to a fixed frequency pulse train.

SUMMARY OF THE INVENTION

The objects of the invention are accomplished, broadly, by a circuit which utilizes a combination of energy discrimination and delay logic for eliminating pulse pile-up by delaying the processing of any pulses that would otherwise follow too soon after any given pulse, wherein means are provided for converting the random pulse train from a detector to a fixed frequency pulse train.

These and other objects, features and advantages of the invention will become apparent to those skilled in the art from the following detailed description, when considered with the accompanying drawing, in which the sole FIGURE is a block circuit diagram of the invention.

Referring to the drawing in more detail, there is illustrated in block diagram a circuit which can be used to aid in reducing the probability of pulse pile-up within instrumentation which is used in conducting a radioactivity well survey. It should be appreciated that the circuits embodied herein find utility in my above-referenced co-pending applications and the disclosure of such application is incorporated herein by reference.

The detector 10, which may be used in a well logging instrument not illustrated, is a scintillation counter arranged for gamma ray spectral analysis in accordance with prior art. In the preferred embodiment, it is a NaI (Tl) crystal having a two inch diameter with a three inch length, such crystal being coupled to a Model Number 4518 photomultiplier tube available from the Radio Corporation of America. Such a crystal-photomultiplier combination may have a resolution of 7.5 to 8.5 percent with a 660 kev cesium 137 peak. The output of the detector 10 is coupled into a discriminator 11, which in turn is coupled into one of the three inputs to the AND gate 12. The discriminator 11 is used to remove pulses having amplitude below a selectable threshold value which might otherwise cause pile-up on the transmission line normally connected to the output terminal 33. A setting of 400 kev is generally suitable for this purpose. The output of the discriminator 11 drives a first modulo 3 scaler-decoder circuit 60 and also triggers a single shot multivibrator circuit 14. The clock 13 drives a second modulo 3 scaler-decoder circuit 73. Also, the clock 13 may be appropriately scaled by a scaler (not illustrated) to synchronize the source with the detection system. The scaled clock pulse activates a high voltage pulser (not illustrated) arranged to cause the neutron output of neutron source 15 to pulse at an appropriate multiple or submultiple of the clock frequency.

The amplified pulses from the detector 10 are also coupled into the delay line 16, which is nominally set to cause a delay of 0.4 microseconds, the output of which is coupled into the three charge and hold circuits 40, 41 and 42.

The output of the single shot multivibrator 14 is coupled into the first gate on each of the three input AND gates 61, 62 and 63, respectively, the outputs of which are coupled into the charge and hold circuits 40, 41 and 42, respectively.

The "0" output of the scaler-decoder circuit 60 is connected to the second input of the three input AND gate 61. The "1" output of the decoder circuit 60 is connected to the second input of the three input AND gate 62 and the number "2" output of the decoder circuit 60 is connected to the second input of the three input AND gate 63. A trio of sense amplifiers 64, 65 and 66 are connected to the capacitors C1, C2 and C3, respectively, for sensing whether such capacitors are charged. The outputs of the amplifiers 64, 65 and 66 are connected to the third inputs of the AND gates 61, 62 and 63, respectively. Interrogator circuits 67, 68 and 69 are connected, respectively, to the capacitors C1, C2 and C3. The capacitor C1 is associated with the charge and hold circuit 40 for the storage of any detector pulse appearing in the circuit 40. The interrogator circuit 67, for example a linear gate circuit, also has means for discharging the capacitor C1 in a manner known in the art since such interrogator circuits are conventional. The outputs of the interrogators 67, 68 and 69 are coupled, respectively, through the resistors 70, 71 and 72 to the line amplifier 32.

The clock 13 also drives a second modulo 3 scaler-decoder circuit 73, the outputs of which are connected to drive three single shot multivibrators 74, 75 and 76, respectively, which in turn gate the interrogator circuits 67, 68 and 69, respectively.

In the operation of the circuit, the detector pulses from detector 10 are coupled to the discriminator 11 and via the delay line 16 to the inputs of the charge and hold circuits 40, 41 and 42. The discriminator output drives the monostable multivibrator 14 and the modulo 3 scaler-decoder circuit 60. The output of the single shot multivibrator 14 and one of the three decoder outputs from the decoder circuit 60 and the output from one of the sense amplifiers 64, 65 and 66 determine if the particular charge and hold circuit is already storing a pulse and together cause one of the AND gate circuits 61, 62 and 63 to control its respective charge and hold circuit 40, 41 and 42. The second modulo 3 scaler-decoder circuit 73 is driven by the clock 13 with a frequency slightly lower than the pulse pair resolving frequency of any limiting element in the analysis system. The outputs of the decoder circuit 73 drive the single shot multivibrators 74, 75 and 76, respectively, to control the interrogator circuit of the particular channel. The interrogator outputs are fed to the line amplifier 32 and output terminal 33 for transmission to the earth's surface, and the output terminal 33. The output terminal 33 corresponds to a point which would normally be associated with the amplification and transmittal of pulses to the earth's surface in well logging utility. Thus, it should be appreciated that pulses are sequentially stored at random time intervals in the charge and hold circuits but are read out at fixed time intervals as determined by the clock frequency, the scaler-decoder circuit 73 and the single shot multivibrator-interrogator combinations.

Again it should be appreciated that the discriminator 11 may be used to reject unwanted low energy pulses but that all the pulses can be passed through the system if the discriminator is set low enough. Also it should be appreciated that additional pulse sorting can be accomplished prior to storage and transmission if desired, for example, as by using other known pile-up detection circuits to reject pulses in near coincidence.

In viewing the operation of the circuit herein, the random pulse train from the detector 10 is converted to a fixed frequency pulse train with a period slightly longer than the pulse pair resolving time of the limiting element in the system. The maximum number of pulses per second that can be processed by a system is the reciprocal of the resolving time and any pulse that might occur during the resolving time interval immediately following a pulse being processed is lost.

Since radioactive decay is distributed in a Poisson distribution, the probability that one or more random pulses occur in a given time interval immediately following another pulse is $$P(n) = (Nt)^n e^{-Nt}/n!$$

Where $n$ = number of pulses in the interval
$N$ = mean pulse rate
$t$ = measuring interval.
Therefore, for $N$ = N maximum,
$Nt$ = 1; and
$P(1) = e^{-1} = 0.367,$
$P(2) = e^{-1}/2 = 0.183$
$P(3) = e^{-1}/1\cdot 2\cdot 3 = 0.061$
The probability that no pulses are lost is $$P_{(o)} = e^{-nt} = e^{-1} = 0.367.$$

The average number of pulses lost during each resolving time interval during which a pulse is being processed is $$\bar{N} = \sum_{n=1}^{\infty} nP(n)[t] = Nt$$

Therefore, when $Nt = 1$, 50 percent of the pulses in a random pulse train will be lost. Thus, if the circuit in the sole FIGURE stores a maximum of three pulses, having three channels, the data loss can be reduced from about 50 percent to about 15 percent when the mean pulse rate equals the reciprocal of the resolving time of a system. By adding a fourth channel, the loss can be reduced to about 5 percent.

For ease of illustration, the circuit has been described for processing a maximum of three detector pulses per gating interval. It should be appreciated, however, that more or less pulses can be processed by a different number of channels. The length of the gating interval and the decay time of the detector will determine the maximum. This method has been shown to greatly increase the data rate when fast detectors are used, such as with solid state or other fast detectors.

If it is desirable to process all detector pulses, the discriminator is set just above the noise level. However, additional pulse selection can be made by adjusting the threshold to eliminate undesirable low energy pulses.

For sake of clarification, it should be appreciated that the sense amplifiers 64, 65 and 66 are "inhibit" type amplifiers wherein a signal is applied to the third input of the AND gates 61, 62 and 63 only when there is no charge on the respective capacitors C1, C2 and C3.

The embodiments of the invention in which an exclusive property or privilege is claimed are defined as follows:

1. In an electrical circuit in which electrical pulses are cyclically and randomly associated with a synchronized event, the improvement comprising:
   clock means for producing a series of synchronizing gate pulses;
   an input terminal for receiving electrical pulses associated with said synchronizing gate pulses;
   delay means connected to said input terminal;
   a plurality of charge and hold circuits connected to the output of said delay line;
   means to sequentially gate said charge and hold circuits in response to signals appearing at said input terminal; and
   means connected to said clock means to interrogate said charge and hold circuits at a fixed frequency subsequent to each such synchronized gate pulse.

2. In an electrical circuit in which electrical pulses are cyclically and randomly associated with a synchronized event, the improvement comprising:
   clock means for producing a series of synchronizing gate pulses;
   an input terminal for receiving electrical pulses associated with said synchronizing gate pulses;
   delay means connected to said input terminal;
   N number of charge and hold circuits connected to the output of said delay line;

means to sequentially gate said charge and hold circuits, including a first modulo N scaler-decoder connected to said input terminal, where N is any number more than one, in response to signals appearing at said input terminal; and means connected to said clock means to interrogate said charge and hold circuits at a fixed frequency subsequent to each such synchronized gate pulse.

3. In the circuit according to claim 6, wherein said means to interrogate includes a second modulo N scaler-decoder connected to gate N number of interrogator circuits connected to the outputs of said N number of charge and hold circuits, respectively.

4. In the circuit according to claim 3, being further characterized as including discriminator means between said input terminal and the input of said first scaler-decoder.

5. In the circuit according to claim 3, being further characterized as including discriminator means between said input terminal and said sequential gating means.

6. In the circuit according to claim 3, wherein said gating means includes N number of AND gates, said N number of charge and hold circuits include N number of capacitors, respectively, and being further characterized as including N number of inhibit sense amplifiers connected between said capacitors and one input of said AND gates, respectively, whereby said AND gates can be gated only if its said respective capacitor is not charged.

* * * * *